Patented July 21, 1953

2,646,423

UNITED STATES PATENT OFFICE 2,646,423

POLYMERS OF ALKENYL AROMATIC COMPOUNDS AND ACRYLONITRILE AND METHOD OF MAKING THE SAME

Henry W. Wehr and Floyd B. Nagle, Midland, Mich., assignors to The Dow Chemical Company, Midland, Mich., a corporation of Delaware No Drawing. Application May 25, 1951, Serial No. 228,352

7 Claims. (Cl. 260—80.5)

This invention relates to copolymers of alkenyl aromatic hydrocarbons with acrylonitrile. It particularly concerns a method and agents for regulating the molecular weight of the copolymers obtained by the polymerization of one or more alkenyl aromatic hydrocarbons with acrylonitrile so as to improve the molding characteristics of such copolymers.

Resinous copolymers of alkenyl aromatic hydrocarbons, e. g. styrene, and acrylonitrile and methods of making the same are well known. The resinous polymeric products containing from about 20 to 37.5 per cent by weight of chemically combined acrylonitrile are known to possess desirable properties, e. g. transparency, luster, good strength characteristics, resistance to solvents such as gasoline and carbon tetrachloride, and ability to be molded under pressure at elevated temperatures, which render them suitable for the manufacture of a variety of molded articles which are useful for many purposes.

However, such resinous polymeric products, e. g. a copolymer of styrene and acrylonitrile, are often undesirably resistant to rapid flow during molding, and difficulties have been encountered in producing accurate molding at the rapid rates required in commercial operations. Such difficulties have been particularly pronounced in instances in which irregular shaped articles were to be produced by injection molding methods. It is known that the physical and mechanical properties, e. g. the flow characteristics, of the copolymers are dependent in part upon the molecular weight of the polymer and that the molecular weight is in turn determined by the conditions under which the polymerization is carried out. It is known that the molecular weight of the product can be lowered by raising the temperature at which the polymerization is carried out, or by carrying out the polymerization in the presence of a solvent for the polymer. Raising the temperature at which the polymerization is carried out to lower the molecular weight of the product is often undesirable since it involves a considerable increase in the rate of the polymerization reaction and may result in an uncontrollable strongly exothermic or "runaway" polymerization reaction, or in discoloring of the polymeric product by overheating the same. Dilution of the reaction mixture with a solvent usually causes a considerable reduction in the rate of reaction and a lowering of the molecular weight of the polymer. In most instances, the proportion of solvent required to reduce the molecular weight of the product by any great amount, e. g. to one-half of that of the product obtained in the absence of the solvent under otherwise similar polymerization conditions, is quite large and adds considerably to the cost of the operations.

It is an object of the invention to provide a method and agents for regulating the polymerization reaction and controlling the molecular weight of the polymeric product obtained by the polymerization of a composition of monoethylenically unsaturated aromatic hydrocarbons composed of at least one alkenyl aromatic hydrocarbon in major amount, together with a minor amount of acrylonitrile so as to produce copolymers having substantially improved molding characteristics, e. g. flow properties. Another object is to provide a method and agents for polymerizing a composition composed of a predominant amount of at least one monovinyl aromatic hydrocarbon and a minor amount of acrylonitrile in bulk so as to avoid the occurrence of an extremely vigorous exothermic polymerization reaction. Other and related objects will become apparent from the following description of the invention.

According to the invention the foregoing and related objects are obtained by polymerizing a composition composed of at least one alkenyl aromatic hydrocarbon and acrylonitrile, wherein the polymerizable portion is from 20 to 37.5 per cent by weight of acrylonitrile and from 80 to 62.5 per cent of at least one alkenyl aromatic hydrocarbon having a single vinyl or isopropenyl radical directly attached to a carbon atom of the aromatic nucleus, in the presence of an unsaturated dimer of a monomeric alpha-alkyl aromatic compound having the general formula:

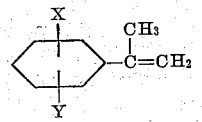

wherein each of the symbols X and Y represents the same or different members of the group consisting of hydrogen, halogens and lower alkyl radicals containing not more than three carbon atoms. For convenience, the alpha-alkyl-vinyl aromatic compounds having the above formula are hereinafter referred to as "alpha-alkyl styrenes."

By incorporating a small amount, suitably from 0.01 to 2 per cent by weight, of an unsaturated dimer of a monomeric alpha-alkyl styrene having the aforementioned formula with one or more monoalkenyl aromatic hydrocarbons and polymerizing the same in any usual way, e. g. in mass, the tendency toward the occurrence of an extremely vigorous exothermic polymerization reaction is not only suppressed, but the polymerization proceeds so as to form a polymeric product composed for the most part of polymer molecules having a relatively narrow range of molecular weights. The effect of an unsaturated dimer of an alpha-alkyl styrene in causing a reduction in the average molecular weight of the polymer, and in suppressing the tendency toward the occurrence of an extremely vigorous exothermic polymerization reaction, results in the formation of polymeric products which have improved molding characteristics, e. g. flow properties, and better color than is obtained in the absence of such dimer under otherwise similar polymerization conditions.

The unsaturated dimers of a monomeric alpha-alkyl styrene having the aforementioned general formula, which are employed as polymerization regulators, or agents, for modifying the polymerization of one or more alkenyl aromatic hydrocarbons with acrylonitrile may be prepared by procedure described in United States Patent 2,429,719. Examples of suitable monomeric alpha-alkyl styrenes from which the corresponding unsaturated dimers may be prepared are alpha-methyl styrene, para-methyl-alpha-methyl styrene, meta - methyl - alpha - methyl styrene, para - ethyl - alpha - methyl styrene, para - isopropyl - alpha - methyl styrene, ar - dimethyl-alpha - methyl styrene, ar - chloro - alpha - methyl styrene, 3,4 - dichloro - alpha - methyl styrene, ar - chloro - ar - methyl - alpha - methyl styrene, ar - diethyl - alpha - methyl styrene, and ar - isopropyl - ar - methyl - alpha - methyl styrene.

The olefinic product obtained by the dimerization, i. e. the reaction of two molecules of such a monomeric alpha-alkyl styrene with each other, is usually a mixture of the corresponding isomeric 1-pentene and 2-pentene derivatives which are difficult to separate from each other in usual ways, e. g. by distillation. For instance, the monoolefinic product obtained by dimerizing alpha-methyl styrene, i. e. by reacting two molecules of alpha-methyl styrene with each other, usually consists of a mixture of the isomeric compounds 2,4-diphenyl-4-methyl-2-pentene and 2,4-diphenyl-4-methyl-1-pentene. The latter compound has an effect of causing a more pronounced lowering of the molecular weight of the polymer formed by the polymerization of a given mixture of an alkenyl aromatic compound, e. g. styrene, and acrylonitrile than has a like amount of the compound 2,4-diphenyl-4-methyl-2-pentene under otherwise similar polymerization conditions. However, both of the isomeric unsaturated dimers of an alpha-methyl styrene are effective polymerization modifying agents for regulating the molecular weight of the polymeric product, and for controlling the polymerization reaction, so that mixtures of the isomeric unsaturated dimers may satisfactorily be used. The unsaturated dimers of the alpha-alkyl styrenes are usually employed as a liquid composed principally of a mixture of the corresponding isomeric derivatives of 1-pentene and 2-pentene, together with a minor amount, e. g. 15 per cent by weight or less, of the corresponding saturated or cyclic dimer of the monomeric alpha-alkyl styrene, although the unsaturated dimers may be used in pure or substantially pure form.

The effect of an unsaturated dimer of an alpha-alkyl styrene in causing a reduction in the molecular weight of the product becomes more pronounced as the proportion thereof in the reaction mixture is increased from a trace, e. g. from 0.01 to 2 per cent by weight. Further increases in the proportion of the unsaturated dimer of an alpha-alkyl styrene may cause a continued lowering of the molecular weight of the polymer which is formed, but this effect becomes less pronounced as the proportion of the unsaturated dimer is increased, e. g. from 2 to 5 per cent by weight or more of the mixture. For these reasons the unsaturated dimer of an alpha-alkyl styrene as hereinbefore mentioned is used in amount corresponding to from 0.01 to 2 per cent by weight of the polymerizable starting materials.

Any alkenyl aromatic hydrocarbon having a single vinyl or isopropenyl radical directly attached to a carbon atom of the aromatic nucleus and which is copolymerizable with acrylonitrile may be used in the process. Examples of suitable alkenyl aromatic hydrocarbons are styrene, ortho-, meta-, and para-methylstyrene, meta-ethylstyrene, para - isopropylstyrene, alpha-methyl styrene, alpha - ethyl styrene, para-methyl-alpha-methyl styrene, ar-dimethyl-styrene, ar - diethylstyrene, ar - dimethyl - alpha-methyl styrene, ar - methyl - ar - ethylstyrene and ar-diisopropylstyrene. Mixtures of any two or more of such alkenyl aromatic hydrocarbons may also be used.

In practice the unsaturated dimers of an alpha-alkyl styrene, e. g. the unsaturated dimers of alpha-methyl styrene, are mixed with the polymerizable composition of acrylonitrile and at least one monoalkenyl aromatic hydrocarbon, in the desired proportion prior to effecting the polymerization. The unsaturated dimer of an alpha-alkyl styrene is usually added before effecting the polymerization but there are instances in which a mixture of a polymer of high molecular weight and a corresponding polymer of relatively low molecular weight is desired and in such instance the unsaturated dimer may advantageously be added during the polymerization reaction. The polymerization may be carried out in any usual way, e. g. by heating the mixture of ingredients in mass or in aqueous emulsion, but is preferably carried out in bulk, i. e. in the substantial absence of an inert liquid medium. The polymerization in mass is usually carried out at temperatures between 60° and 165° C. and at the superatmospheric pressure of the reactants. The polymerization may be carried out batchwise or in continuous manner. The polymeric product is frequently obtained in a form suitable for direct employment for the intended purpose, but when necessary is treated in any usual way to obtain the same in the desired form. For instance, when the polymerization has been carried out in mass volatile ingredients are usually vaporized from the product by heating in vacuum and the product is thereafter cooled and cut or ground to a granular form. When the polymerization has been carried out in aqueous emulsion, the product is coagulated in usual way, e. g. by strong heating or cooling of the emulsion or by adding a variety of agents such as sodium chloride, aluminum sulfate, or acids which are capable of causing coagulation and the product is separated from the liquor and washed and dried. For polymerizations carried out in aqueous emulsion catalysts such as hydrogen peroxide, ammonium persulfate, potassium persulfate, or sodium perborate, are usually employed. When the polymerization is carried out in mass, i. e. in the substantial absence of inert liquid media, catalysts such as benzoyl peroxide, tertiary-butyl hydroperoxide, di-tertiary-butyl peroxide, or tertiary-butyl perbenzoate may advantageously be added.

The following examples illustrate ways in which the principle of the invention has been applied, but are not to be construed as limiting the invention.

EXAMPLE 1

In each of a series of experiments, 250 grams of a mixture of styrene, alpha-methyl styrene, acrylonitrile and unsaturated dimers of alpha-methyl styrene in the relative proportions stated in the following table, together with 0.03 per cent by weight of benzoyl peroxide as polymerization catalyst, was polymerized by heating the same in a closed container in accordance with the following chedule of time and temperature conditions: 4 days at 60° C.; 2 days at 95° C.; and 6 days at 150° C. The unsaturated dimer used in the experiment was prepared by heating alpha-methyl styrene at a temperature of 120° C., in the presence of one per cent by weight of an aqueous 36 weight per cent hydrochloric acid solution, for a time of 16 hours, and thereafter separating the unsaturated dimer from the reaction mixture. The unsaturated dimer was a liquid boiling at a temperature of 174° C. at 8 millimeters absolute pressure, and had a specific gravity of 0.984 at 25° C. compared to that of water at the same temperature. The polymeric product from each experiment was removed from the container and was crushed to a granular form. The rate of flow at 135° C. in terms of seconds required for a sample of the material to flow one and one-half inches through a 1/8 inch orifice under an applied pressure of 1000 pounds per square inch was determined in accordance with procedure described in A. S. T. M. D569–44T. The time required for this amount of flow becomes less with increase in rate of flow. The rate of flow becomes less with lowering in molecular weight. A portion of each product was tested to determine a viscosity characteristic. The procedure in determining the viscosity characteristic was to dissolve a portion of the product in N,N-dimethyl formamide to form a solution containing 0.5 gram of the material in 100 millimeters of solvent and determine the absolute viscosity in centipoises at 25° C. of the solution. The viscosity of the solution becomes less with lowering in molecular weight of the product. Table I identifies each product by giving the relative proportions in per cent by weight of the ingredients from which it was prepared. The table also gives the flow rate in seconds and a viscosity characteristic for the polymers.

Table I

| Run No. | Starting Materials | | | | Products | |
|---|---|---|---|---|---|---|
| | Percent Styrene | Percent Alpha-Methyl Styrene | Percent Acrylonitrile | Percent Unsaturated Dimers of Alpha-Methyl Styrene | Flow Rate, Seconds | Viscosity, cps. |
| 1 | 37.5 | 30 | 32.5 | 0 | [1]>600 | 1.750 |
| 2 | 37.5 | 29.8 | 32.5 | 0.2 | 376 | 1.364 |
| 3 | 37.5 | 29.5 | 32.5 | 0.5 | 160 | 1.231 |

[1] The time required for the polymer to flow a distance of 1.28 inches through the 1/8 inch diameter orifice was 600 seconds.

EXAMPLE 2

In each of a series of experiments, 7.2 grams of a mixture of styrene, alpha-methyl styrene and acrylonitrile, together with unsaturated dimer of alpha-methyl styrene in the proportions as stated in the following table, was polymerized by heating the same in a sealed glass tube at a temperature of 90° C. The polymeric product was removed from the tube and was crushed to a granular form. A viscosity characteristic for the polymer was determined. The procedure in determining the viscosity characteristic was to dissolve a portion of the polymer in methyl ethyl ketone to form a solution containing one gram of the material in 100 cc. of the methyl ethyl ketone at 25° C. and determine the absolute viscosity in centipoises of the solution. Table II identifies each polymeric product by stating the proportions of ingredients in per cent by weight from which it was prepared. The table also gives the viscosity characteristic determined for each polymeric product.

Table II

| Run No. | Starting Materials | | | | Products |
|---|---|---|---|---|---|
| | Percent Styrene | Percent Alpha-Methyl Styrene | Percent Acrylonitrile | Percent Unsaturated Dimers of Alpha-Methyl Styrene | Viscosity, cps. |
| 1 | 48 | 24 | 28 | 0 | 1.113 |
| 2 | 46.75 | 24 | 28 | 1.25 | 0.730 |
| 3 | 46.50 | 24 | 28 | 1.50 | 0.694 |
| 4 | 46.25 | 24 | 28 | 1.75 | 0.678 |
| 5 | 36 | 36 | 28 | 0 | 0.956 |
| 6 | 35.50 | 35.50 | 28 | 1 | 0.713 |
| 7 | 35.37 | 35.38 | 28 | 1.25 | 0.676 |
| 8 | 35.25 | 35.25 | 28 | 1.50 | 0.657 |
| 9 | 24 | 48 | 28 | 0 | 0.844 |
| 10 | 24 | 47.25 | 28 | 0.75 | 0.691 |
| 11 | 24 | 47 | 28 | 1.0 | 0.667 |
| 12 | 24 | 46.75 | 28 | 1.75 | 0.640 |

EXAMPLE 3

In each of a series of experiments, 7.2 grams of a mixture of styrene, acrylonitrile and unsaturated dimers of alpha-methyl styrene in the proportions as stated in the following table, was polymerized by heating the same in a sealed glass tube and under the time and temperature conditions stated in the table. The polymeric product was removed from the container and crushed to a granular form. A viscosity characteristic for each product was determined as described in Example 2. Table III identifies each product by stating the proportion of ingredients in per cent by weight from which it was prepared, and gives the polymerization temperature conditions. The table also gives the viscosity characteristic determined for each polymeric product.

Table III

| Run No. | Starting Materials | | | Polymerization Temp., °C. | Products |
|---|---|---|---|---|---|
| | Percent Styrene | Percent Acrylonitrile | Percent Unsaturated Dimers of Alpha-Methyl Styrene | | Viscosity, cps. |
| 1 | 72 | 28 | 0 | 90 | 1.917 |
| 2 | 70.50 | 28 | 1.50 | 90 | 0.783 |
| 3 | 70.25 | 28 | 1.75 | 90 | 0.761 |
| 4 | 70 | 28 | 2 | 90 | 0.726 |
| 5 | 72 | 28 | 0 | 100 | 1.448 |
| 6 | 70.50 | 28 | 1.50 | 100 | 0.761 |
| 7 | 70.25 | 28 | 1.75 | 100 | 0.742 |
| 8 | 70 | 28 | 2 | 100 | 0.704 |
| 9 | 72 | 28 | 0 | 120 | 1.202 |
| 10 | 70.50 | 28 | 1.50 | 120 | 0.758 |
| 11 | 70.25 | 28 | 1.75 | 120 | 0.721 |
| 12 | 70 | 28 | 2 | 120 | 0.688 |

Other modes of applying the principle of the invention may be employed instead of those explained, change being made as regards the steps or ingredients herein employed, provided the steps or ingredients stated in any of the following claims or the equivalent of such steps or ingredients be employed.

We claim:

1. In a process for polymerizing a mixture of at least one monoalkenyl aromatic hydrocarbon having a single olefinic radical selected from the group consisting of the vinyl and isopropenyl radicals directly attached to a carbon atom of the aromatic nucleus, and acrylonitrile wherein the polymerizable portion is from 20 to 37.5 per cent by weight acrylonitrile, the improvement which consists in carrying out the polymerization in the presence of from 0.01 to 2 per cent by weight based on the polymerizable materials, of an unsaturated dimer of a monomeric alpha-alkyl styrene having the formula:

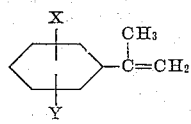

wherein X and Y each represents a member of the group consisting of hydrogen, halogens, and lower alkyl radicals containing not more than three carbon atoms.

2. A process as claimed in claim 1, wherein the polymerization is carried out in the substantial absence of an inert liquid medium.

3. In a process for polymerizing a mixture of at least one monoalkenyl aromatic hydrocarbon having a single olefinic radical selected from the group consisting of the vinyl and isopropenyl radicals directly attached to a carbon atom of the aromatic nucleus, and acrylonitrile wherein the polymerizable portion is from 20 to 37.5 per cent acrylonitrile, the improvement which consists in carrying out the polymerization in the substantial absence of an inert liquid medium and in the presence of from 0.01 to 2 per cent by weight, based on the polymerizable materials, of an unsaturated dimer of alpha-methyl styrene.

4. In a process for polymerizing a mixture of at least one monoalkenyl aromatic hydrocarbon having a single olefinic radical selected from the group consisting of the vinyl and isopropenyl radicals directly attached to a carbon atom of the aromatic nucleus, and acrylonitrile wherein the polymerizable portion is from 20 to 37.5 per cent by weight acrylonitrile, the improvement which consists in carrying out the polymerization in the substantial absence of an inert liquid medium and in the presence of from 0.01 to 2 per cent by weight based on the polymerizable materials, of an unsaturated dimer of para-methyl-alpha-methyl styrene.

5. In a process for polymerizing a mixture of at least one monoalkenyl aromatic hydrocarbon having a single olefinic radical selected from the group consisting of the vinyl and isopropenyl radicals directly attached to a carbon atom of the aromatic nucleus, and acrylonitrile, wherein the polymerizable portion is from 20 to 37.5 per cent by weight acryonitrile, the improvement which consists in carrying out the polymerization in the substantial absence of an inert liquid medium and in the presence of from 0.01 to 2 per cent by weight, based on the polymerizable materials, of an unsaturated dimer of ar-dimethyl-alpha-methyl styrene.

6. In a process for polymerizing a mixture of styrene and acrylonitrile wherein the polymerizable portion is from 20 to 37.5 per cent by weight acrylonitrile, the improvement which consists in carrying out the polymerization in the substantial absence of an inert liquid medium and in the presence of from 0.01 to 2 per cent by weight, based on the polymerizable materials, of an unsaturated dimer of alpha-methyl styrene.

7. In a process for polymerizing a mixture consisting of from 10 to 65 per cent by weight of styrene, from 20 to 60 per cent of alpha-methyl styrene and from 25 to 35 per cent of acrylonitrile, the improvement which consists in carrying out the polymerization in the substantial absence of an inert liquid medium and in the presence of from 0.01 to 2 per cent by weight, based on the polymerizable materials, of an unsaturated dimer of alpha-methyl styrene.

HENRY W. WEHR.
FLOYD B. NAGLE.

References Cited in the file of this patent

UNITED STATES PATENTS

| Number | Name | Date |
|---|---|---|
| 2,489,959 | Dunlap | Nov. 29, 1949 |